United States Patent [19]
Kitami

[11] 3,901,671
[45] Aug. 26, 1975

[54] DUST COLLECTING APPARATUS

[75] Inventor: Yoshiaki Kitami, Nagoya, Japan

[73] Assignee: Senko Kikai Kabushiki Kaisha, Nagoya, Japan

[22] Filed: July 23, 1974

[21] Appl. No.: 490,954

[52] U.S. Cl. .................... 55/304; 55/341; 55/418
[51] Int. Cl. ............................................ B01d 46/04
[58] Field of Search ............ 55/300, 304, 341, 368, 55/378, 418, 419, 305, 282, 301

[56] References Cited
UNITED STATES PATENTS

| 932,686 | 8/1909 | Diserens | 55/368 X |
| 2,792,074 | 5/1957 | Schilb et al. | 55/341 X |

Primary Examiner—Frank W. Lutter
Assistant Examiner—David L. Lacey
Attorney, Agent, or Firm—Kemon, Palmer & Estabrook

[57] ABSTRACT

A dust collecting apparatus including a casing, a suction blower for providing a negatively pressurized atmosphere in the casing, a fabric, hollow cylindrical filter member longitudinally disposed in the casing having closed upper and open lower ends, and a gas inlet tube extending into the fabric filter member through the lower end whereby a dust laden gas may be charged through the gas inlet tube into the fabric filter member and permeate through the meshes of the fabric filter member wall thereby to perform separation of dust particles therefrom.

1 Claim, 2 Drawing Figures

DUST COLLECTING APPARATUS

BACKGROUND OF THE INVENTION

This invention relates to a dust collecting apparatus adapted to remove dust particles from a dust particle laden gas and discharge thus cleaned gas into the environmental air, and particularly to a dust collecting apparatus having a fabric, hollow cylindrical filter member for removing dust particles from a gas.

A dust collecting apparatus of the above mentioned type is known, in which the fabric filter member has a hollow cylindrical wall with its upper end closed and lower end open to a dust collector vessel and is longitudinally housed in a casing negatively pressurized by a blower whereby a dust particle laden gas may be charged into the hollow filter member through the open lower end and permeate through the meshes of the fabric filter member wall into the casing outside of the filter member thereby to cause separation of dust particles from the gas. Dust paricles are dropped through the interior of the filter member and collected in the dust collector vessel. As the foregoing operation has been repeated, the meshes of the filter member wall are progressively clogged by the separated dust particles so as to decrease capability of the filtering action of the filter member. Thus, one must heretofore apply oscillation to the filter member at determined intervals to shake off the clogging dust particles from the filter member wall. Each time the shaking-off action is to be performed, dust particle laden gas must not be charged into the filter member, i.e., the apparatus must be in inoperative condition because the dust particles disengaged from the filter member wall during the shaking-off action would otherwise be influenced by action of a dust laden gas charged into the filter member through the lower end thereof so that they tend to again clog the meshes of the filter member wall.

The above-stated apparatus, accordingly, has the disadvantage of an undesirably low operating efficiency since the dust collecting operation must be stopped during the shaking-off action of the clogging dust particles.

Therefore, an object of this invention is to provide a dust collecting apparatus of the above arrangement which includes a gas inlet tube extending longitudinally in the fabric filter member from the lower end to an intermediate portion thereof and is capable of applying oscillation to the filter member wall to shake-off dust particles therefrom while the dust collecting operation is being performed so that the operation of the apparatus is not required to discontinue thereby to enhance the dust collecting efficiency.

DETAILED DESCRIPTION OF THE EMBODIMENT

Figure 1:
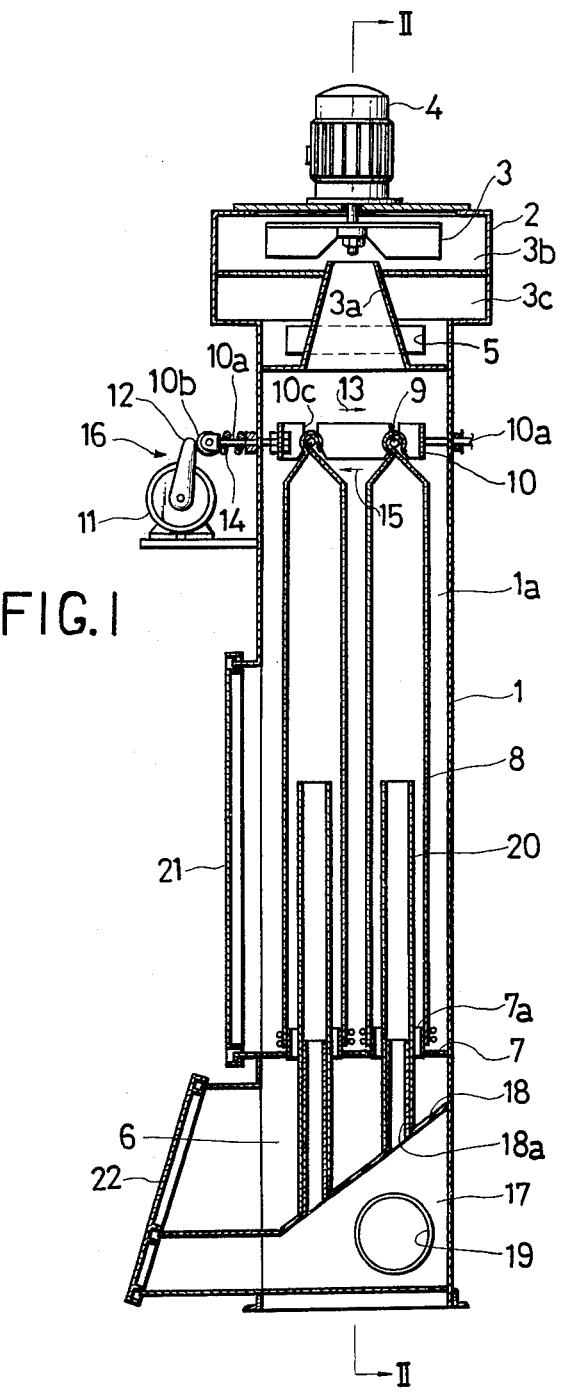
FIG. 1 is a longitudinally sectional view of a dust collecting apparatus embodying this invention.
Figure 2:
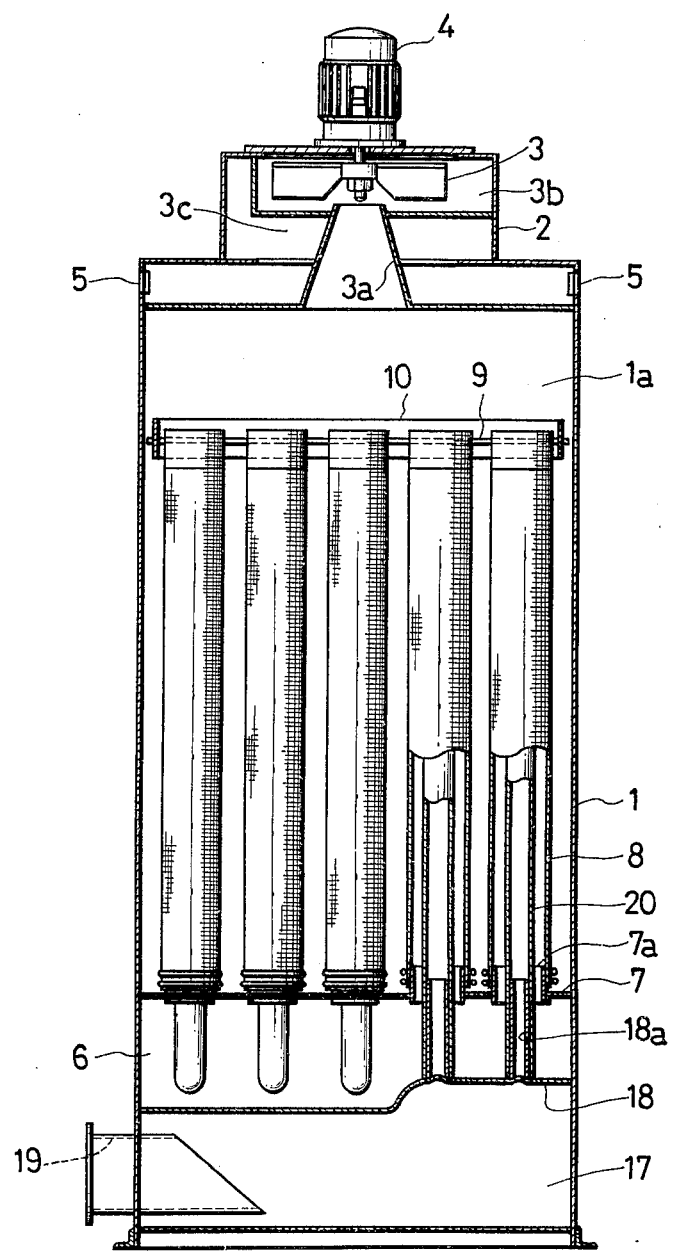
FIG. 2 is also a longitudinally sectional view taken along line II — II of FIG. 1.

Referring to FIGS. 1 and 2, a casing 1 of the dust collecting apparatus has a blower casing section 2 formed on the upper portion thereof. A suction blower 3 housed in the casing section 2 may be rotated by a motor 4 thereby to absorb air from within a dust separating chamber 1A through an outlet port 3A formed in the upper portion of the casing 11 into a swirling chamber 3B for discharge via an annular air passage 3C and an exhaust outlet 5. The casing 1 is provided with a dust collecting vessel 6 in the lower portion thereof and adjacent the above mentioned dust separating chamber 1A. The dust collecting and the dust separating chambers communicate with each other by a plurality of connecting tubes 7A fixedly arranged in a porous plate 7 which is disposed to partition the two chambers.

A plurality of fabric, elongated, hollow cylindrical filter members 8 each having a diameter of 170 mm and a length of 1,600 mm are housed in the casing 1 or the dust separating chamber 1A. The fabric filter members 8 each have an open lower end connected with the connecting tubes 7A of the porous plate 7 so that the interior of the fabric filter members communicates with the dust collecting vessel 6. An upper end of each of the fabric filter members is closed and fixedly wound round a support rod 9 disposed in the upper end portion of the casing 1. The support rod 9 has both extremities placed in U-shaped cut-off portions of a support member 10. The support member 10 is reciprocably supported on lateral walls of the casing 1 by means of a pair of shafts 10A protruding from its opposite, substantially central portions through the lateral casing walls. One of the shafts 10A has a tappet-like roller 10B mounted at the distal end. The support member 10 may thus make a reciprocal movement in which it is moved in the one direction of arrow 13 upon abutting contact of the tappet-like roller 10B with a rotary arm 12 driven by a miniature motor 11 disposed outside of the casing and in the other direction of arrow 15 by action of a spring 14 when the rotary arm 12 comes out of the abutting contact with the tappet-like roller 10B. When the support member 10 is reciprocated, the upper end of the fabric filter member 8 fixed round the support rod 9 may also make a corresponding reciprocal movement since the extremities of the support rod 9 are fitted in the U-shaped cut-off portions of the support member. An oscillating means generally designated by 16 is, thus, formed by support member 10, miniature motor 11, rotary arm 12 and spring 13 thereby to cause oscillation of the fabric filter members 8.

An inlet chamber 17 is formed adjacent the dust collecting chamber 6 by interposition of a slant plate 18 constituting a bottom of the latter chamber. The inlet chamber 17 is communicated with a source of a dust laden gas through an inlet opening 19 on one hand and with the interior of the fabric filter members 8 through the gas inlet tubes 20 on the other hand. Specifically, the gas inlet tubes 20 are telescopically connected at lower ends with tubular couplings 18A vertically disposed on the slant plate 18 and open to the interior of the inlet chamber 17. The gas inlet tubes 20 longitudinally extend in the dust collecting chamber 6 and into the fabric filter members 8 through the lower ends to an intermediate portion thereof. It is desirable that the length of the gas inlet tubes in the fabric filter members be approximately one-third to two-thirds of the whole length of the fabric filter members.

A door unit 21 may be formed in one lateral wall of the casing 1 to provide access to the casing interior for inspection. The dust collector vessel 6 and the inlet chamber 17 have a common closure 22 at their respective openings. The slant, bottom plate 18 of the chamber 6 may cause dust particles collected thereon to slide down into an interior contiguity of the closure 22 and be therein accumulated.

In operation, the suction blower 3 is rotated by the motor 4 and at the same time the miniature motor 11 is also energized to actuate the oscillating means thereby to cause oscillating movement of the fabric filter members. By action of negatively pressurized atmosphere caused in the casing interior by the suction blower, a dust particle laden gas may be charged into the inlet chamber 17 through the opening 19 and therefrom into the fabric filter members 8 through the inlet tubes 20, and forced through the meshes of the fabric filter member wall into the dust separating chamber 1A when dust particles contained in the gas are captured in the fabric filter meshes and separated from the gas. The gas which is thus substantially free of dust particles is exhausted to the atmosphere via outlet port 3A, swirling chamber 3B, annular passage 3C and exhaust outlet 5. The dust particles captured in the filter meshes may immediately be disengaged therefrom because of the oscillating movement of the fabric filter members by the means 16 and dropped off by weight through the connecting tubes 7A into the collector vessel 6 in which they are massively accumulated.

The function of the gas inlet tubes 20 will now be described. In a prior art apparatus having no gas inlet tubes, a dust particle laden gas that is charged into the fabric filter members directly through the tubular couplings 18A open in the lowest end thereof is forced to flow upward along within the fabric filter members at a high flow rate. The upward flowing gas on the shaking-off action of the filter members acts to prevent the self-weight dropping action of dust particles from the filter member wall and cause the dust particles to be recaptured in the meshes of the fabric filter member wall. The apparatus of this invention as opposed to the above arrangement includes a dust particle laden gas passage extending into the fabric filter members to have an outlet opening in a position adjacent an intermediate portion thereof so that the gas may be led to contiguity of the intermediate portion of the filter member, and moreover defining a substantially reduced cross sectional area as compared to that of the fabric filter members. Such a gas passage, say the inlet tubes 20, abruptly reduces flow rate of the dust particle laden gas when charged into the fabric filter members and permits the gas to be calmly diffused in the filter member interior. Dust particles captured in the meshes of the fabric filter wall when released therefrom by the oscillation are thus enabled to be dropped down freely because of the absence of such strong upward flowing of a successively charged gas. Accordingly, the shaking-off action of dust particles clogging the fabric wall of the filter member may be performed simultaneously with charging a dust particle laden gas through the inlet tubes 20 into the fabric filter members 8 for the dust collecting operation of the apparatus, thereby to enhance operating efficiency thereof. It is apparent that operating efficiency may be enhanced also when the fabric filter members are oscillated intermittently during the operation of the apparatus.

What is claimed is:

1. In dust collecting apparatus comprising a casing, a dust laden-gas inlet in said casing, suction blower means for providing a negatively pressurized atmosphere in said casing, a dust collector vessel disposed in a lower portion of said casing, a plurality of connecting tubes providing communication between the interior of said casing and said dust collector vessel, a plurality of fabric, hollow cylindrical filter members longitudinally disposed in said casing and having a closed upper end and a lower open end connected to each of said plurality of connecting tubes, and oscillating means supporting the upper ends of said plurality of fabric filter members to apply oscillation to said fabric filter members, the improvement which comprises a gas inlet tube extending in each of said fabric filter members to have an open upper end adjacent the intermediate region thereof in the longitudinal direction of said fabric filter member and an open lower end communicating with said gas inlet, said blower means charges a dust-laden gas through said inlet and then through the upper open end of said gas inlet tube into each of said fabric filter members, and means for driving said oscillating means while a dust-laden gas is being charged into each of said fabric filter members.

* * * * *